United States Patent
Svendsen et al.

(10) Patent No.: US 6,757,684 B2
(45) Date of Patent: Jun. 29, 2004

(54) NETWORK-BASED PHOTOSHARING ARCHITECTURE

(75) Inventors: Hugh Svendsen, Apex, NC (US); Robert Paul Morris, Raleigh, NC (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 249 days.

(21) Appl. No.: 09/968,393

(22) Filed: Oct. 1, 2001

(65) Prior Publication Data

US 2003/0063770 A1 Apr. 3, 2003

(51) Int. Cl.$^7$ ............................................. G06F 17/30
(52) U.S. Cl. ............................ 707/10; 707/3; 707/102; 707/104.1
(58) Field of Search ............................... 707/3, 10, 102, 707/104.1; 709/204

(56) References Cited

U.S. PATENT DOCUMENTS

| | | |
|---|---|---|
| 5,812,768 A * | 9/1998 | Page et al. ................... 709/228 |
| 6,115,717 A | 9/2000 | Mehrotra et al. |
| 6,202,061 B1 | 3/2001 | Khosla et al. |
| 6,249,787 B1 | 6/2001 | Schleimer et al. |
| 6,275,829 B1 | 8/2001 | Angiulo et al. |
| 6,282,548 B1 | 8/2001 | Burner et al. |
| 6,366,907 B1 * | 4/2002 | Fanning et al. ................. 707/3 |
| 6,583,799 B1 * | 6/2003 | Manolis et al. ............. 345/838 |

OTHER PUBLICATIONS

Kan et al, U.S. Patent Application No. 2003/0088544 A1, May 8, 2003.*
Lennon et al , U.S. Patent Application No. 2003/0018607 A1, jan. 23, 2003.*
Devine et al, U.S. Patent Application No. 2002/0095399 A1, Jul. 18, 2002.*
Yeager et al, U.S. Patent Application No. 2003/0070070 A1, Apr. 10, 2003.*
Traversat et al, U.S. Patent Application No. 2002/0184310 A1, Dec. 5, 2002.*

* cited by examiner

Primary Examiner—Greta Robinson
Assistant Examiner—Debbie M. Le
(74) Attorney, Agent, or Firm—Sawyer Law Group LLP

(57) ABSTRACT

A method and system for providing a network-based photosharing service is disclosed. The photosharing service includes a central photosharing site having a server, and a plurality of peer nodes each containing digital images. The method and system include associating metadata with each image that is to be shared. The images are shared by uploading the metadata associated with each image from the peer nodes to the peer server, while maintaining storage of the images on the respective peer nodes. In response to the peer server receiving search criteria based on the metadata submitted from a first one of the peer nodes, the peer server returns a list of image locators for images matching the search criteria to the first peer node. The method and system further include dynamically generating on the first peer node an image album that contains at least a portion of the matching images.

35 Claims, 14 Drawing Sheets

Installation & Sign-up

Peer Server Synchronization

Peer Server Synchronization

Uploading Metadata

Uploading Group Metadata

Batch Uploading Metadata

Single Image Metadata Uploading

Album Management

Album Content Management

Album Presentation Management

NETWORK-BASED PHOTOSHARING ARCHITECTURE

FIELD OF THE INVENTION

The present invention relates to electronic storage and sharing of digital images, and more particularly to an improved photosharing architecture.

BACKGROUND OF THE INVENTION

Over the past several years, photosharing has become widely accepted by photo enthusiasts. Many websites currently exist that allow users to upload digital images to the site for storage on a server and for viewing by others over the Internet. To share photos, users must first register on a photosharing website, and create an image album in which to store their images. The user typically selects a theme for the image album and selects one or more images to upload to the site from their PC. The images are then uploaded to a server for storage and associated with the selected album. After creating the image album, the user may optionally rename and/or edit each photo.

Metadata, which is typically associated with an image or group or images, is typically supported by photosharing sites. This metadata is restricted in that users cannot define new metadata fields or are limited to a fixed number of "user defined" fields. Metadata support usually does not extend much beyond that defined by the Exif image file format standard. Searches are usually limited to only a subset of the limited metadata that is supported by a site.

The user may then notify others of the album using one of two methods. In the first method, the user sets preferences for the album specifying what users have permission to view the album, and personally informs each person of the web address of the album. In the second and more common method, the user types-in the e-mail addresses of each person the user wants to view the album and the photosharing site automatically sends an e-mail inviting recipients to view the album by clicking on the enclosed URL.

Although the current approach to photosharing works for its intended purpose, there are some areas where the traditional server centric photosharing falls short. Those areas include the difficulties users encounter when attempting to upload images to the site, and the cumbersome process of organizing images once on the site. Due to these difficulties, users predominantly store the majority of their images on their local PC, and upload only those images that they really wish to share with others. Because the shortcomings of current photosharing sites force users to store some of their images on their PCs and other images on the photosharing site, the usage model for web-based photosharing is unnecessarily complicated.

Another problem associated with current photosharing websites is the infrastructure cost inherit in hosting such a space intensive application on a single site. Not only do traditional photosharing sites require vast amounts of disk space to store the photos of all their users, but the owners of the websites must also incur the cost of redundant disk space that is used for backup purposes. Based on high infrastructure costs and the increasing number of users, it is believed that most photosharing sites will pass on this cost to users by transitioning from a free service to a monthly subscription fee model. Charging a fee for using photosharing websites may actually inhibit the widespread adoption of such sites.

Accordingly, what is needed is an improved photosharing architecture. The photosharing architecture should solve both storage and usability problems, and alleviate infrastructure requirements for photosharing. The present invention addresses such a need.

SUMMARY

The present invention is a method and system for providing a network-based photosharing service. The photosharing service includes a central photosharing site known as the peer server, and a plurality of peer nodes each containing digital images. The method and system include associating metadata with each image that is to be shared. The images are shared by uploading the metadata associated with each image from the peer nodes to the peer server, while maintaining storage of the images on the respective peer nodes. In response to the peer server receiving search criteria based on the metadata submitted from a first one of the peer nodes, the peer server returns a list of image locators for images matching the search criteria to the first peer node. The method and system further include dynamically generating on the first peer node an image album that contains at least a portion of the matching images.

According to the method and system disclosed herein, the present invention provides a network-based photosharing architecture that solves both storage and usability problems, while greatly enhancing searching capabilities.

DETAILED DESCRIPTION OF THE INVENTION

The present invention relates to a method and system for providing a web-based, peer-to-peer photosharing service. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides an improved network photosharing service that solves storage problems encountered by photosharing service providers and also solves photo sharing usability problems encountered by users of the service. The present invention provides a web-based, peer-to-peer photosharing service in which all workstations and computers in the network store their own images and act as servers to other users on the network. A central server, known as the peer server, is provided that stores metadata about all of the images and provides users with a search capability to find images of interest.

Figure 1:
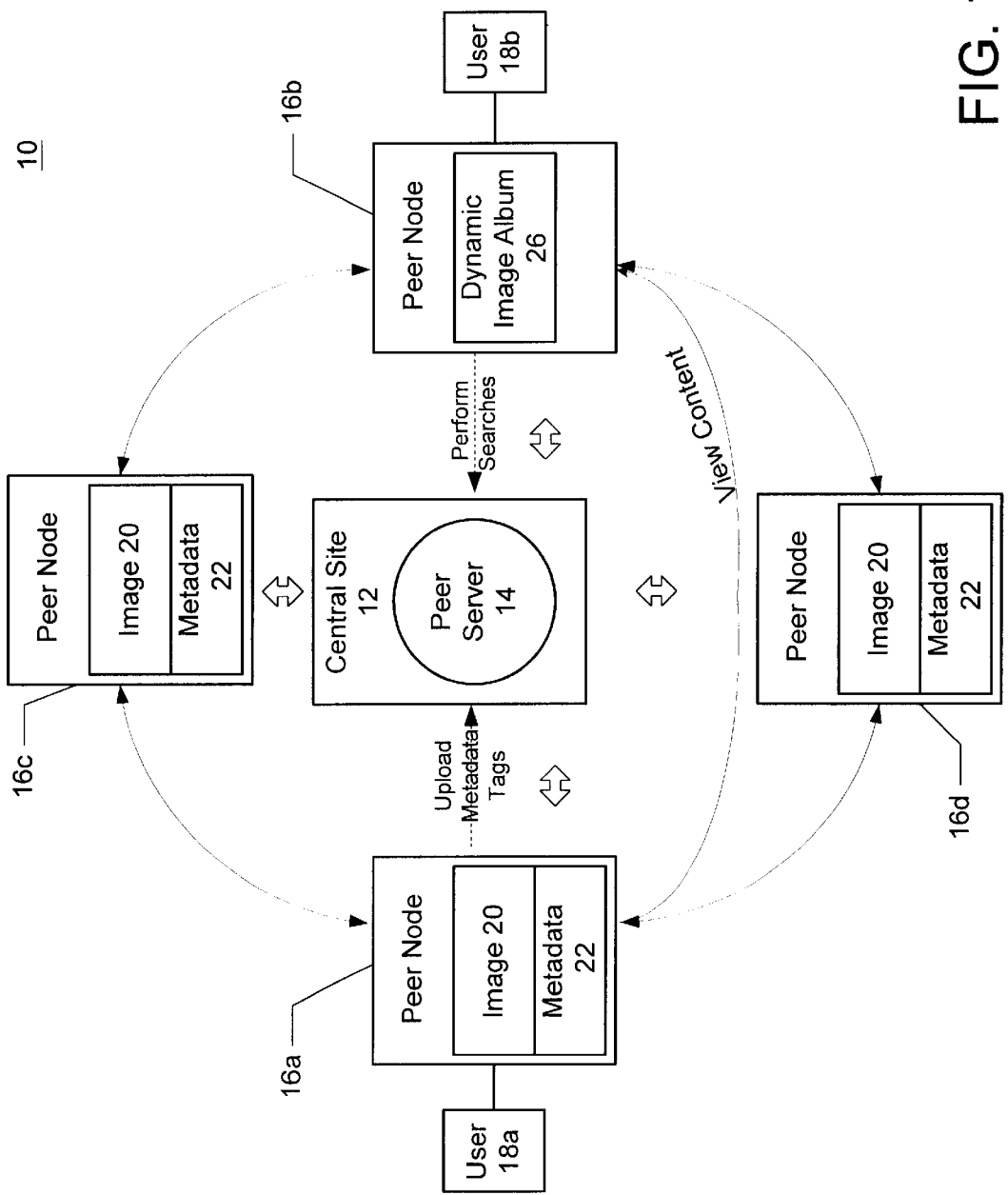
FIG. 1 is a block diagram illustrating a network-based photosharing system in accordance with a preferred embodiment of the present invention.

FIG. 1 is a block diagram illustrating a peer-to-peer (P2P) photosharing system in accordance with a preferred embodiment of the present invention. According to the present invention, the system 10 includes a central photosharing website 12 that includes a peer server 14, and multiple peer nodes 16. The peer server 14 and each of the peer nodes 16 are capable of communicating with one another over a network, such as the Internet. In a preferred embodiment, users 18 may also access the central site 12 from devices or clients (not shown) that are not peer nodes 16, via the use of a standard web browser.

In a preferred embodiment, the peer nodes 16 may each represent either a website or a computer, and typically store the digital images 20 of a particular user 18. A peer node may store the images of more than one user. For example, two family members which share a home PC, but manage their images separately may maintain separate accounts with the system 10 on the shared PC The digital images 20 are stored as image files that include image data. Each image also has metadata 22 associated with it that describe and categorize the image. The metadata 22 may be associated with the images 20 by the user 18 or automatically by the peer node 16 as described below. In addition some or all of the metadata 22 may be associated with the image by a digital camera at the time of image capture. Each image 20 may also be associated with a particular type of metadata, which is a smaller representation of the image data, called a thumbnail image 24.

The present invention is in contrast to the traditional photosharing model where the user 18 would post digital images by uploading the images from his or her computer to a webserver for storage in a static album. Instead, in the present invention, the peer nodes 16 maintain storage of the actual image data and only the metadata 22 (and, in particular, the thumbnail image 24) for each image are uploaded to the peer server 14. Users 18 of the peer nodes 16 register themselves and their peer nodes 16 with the peer server 14 to become members of the service so that other users 18 can search for and view their images 20. The peer server 14 maintains a list of users 18, a list of groups to which users may belong, and peer nodes 16, and provides a search engine and a cache of the metadata for each shared image.

According to a further aspect of the present invention, users 18 may dynamically create image albums 26 for viewing the images 20 by submitting search criteria that are based on metadata 22. In FIG. 1 for example, user 18a has shared images 20 on the central site 12 by uploading the metadata 22 to the peer server 14. User 18b may then submit a search to the peer server 14 to view images 20, which match the search criteria.

In response, the peer server 14 returns a list of image locators (e.g., URLs) for images 20 matching the search criteria to peer node 16b. The user 18b then selects entries on the list corresponding to the images to be contained in the album 26. In a preferred embodiment, the user 18b is shown a list of thumbnail images with some subset of metatdata which identifies the image and/or its source, rather than a list of image names. In an alternative embodiment, peer node 16b may display the list of peer nodes 16 with matching images before retrieving any image data and/or additional metadata, and allow the user to select which peer nodes 16 to use in composing the album.

After the user 18b makes his or her selections from the list, the peer node 16b sends requests using the image locators to retrieve the matching images as needed.

The handling of the requests depends on where the images are being retrieved from. There are three cases: 1) one or more of the selected images are stored on the requesting peer node, 2) one or more of the images are stored on a peer node that may or may not be online at the time, and may or may not have a reachable network address, and 3) the request is for thumbnail images, which are stored on both the peer server 14 and the peer nodes that shared the corresponding images.

If one or more of the matching images are stored on the requesting peer node 16b, then the images are retrieved from the requesting peer node 16b for incorporation into the album 26. If one or more images are stored on another peer node 16 that is online and has a network address which is reachable from peer node 16b, then the image locators returned from the peer server 14 direct the peer node 16b to the other peer node 16 for retrieval of the images. In a preferred embodiment, the image locators returned by the server to the peer node 16b indicate which nodes are currently online so that the peer node 16b can send the URL request directly to the corresponding peer nodes 16 without first sending the request to the peer server 14.

If one or more images are stored on another peer node 16 that is currently offline, or does not have a network address which is reachable from peer node 16b, the image locators are modified to route the request for the images back to the peer server 14, which in the case of a firewall, acts as a proxy for the peer node 16. After becoming a proxy, the peer server 14 routes the image requests and responses appropriately. If the album 26 that is to be generated includes thumbnail images, which are part of the metadata that is uploaded to the peer server 14, then the server 14 returns the thumbnails directly to the peer node 16b, eliminating the need to retrieve the thumbnails from other peer nodes 16.

As the peer node 16b receives the responses, the peer node 16b aggregates the responses to produce a view of the album 26. In a preferred embodiment, peer node 16b composes one or more web pages which user 18 is able to view in a web browser. Peer node 16b may retrieve the presentation components such as graphic art, page templates, and so on from peer server 14 as needed. Peer node 16b may cache presentation components retrieved from the peer server 14 for future use to enhance performance.

According to the present invention, image albums 26 are not statically defined as they are traditional photosharing sites. Instead albums 26 are defined by search criteria, which are based on the metadata 22 and generated on the user's peer node in real-time using not only the user's own images 20, but also the images 20 of other peer nodes. In a preferred embodiment, the albums 26 created as a result of the searches and/or the search criteria may also be saved. They may be saved as search criteria or as the result from the initial search criteria subject to the preferences of the user.

The peer-to-peer photosharing system 10 of the present invention has several advantages over traditional photosharing, including:

significantly reduced image upload time, since images 20 are stored locally, search capability for all images in the system, the user retains control over locally stored images, dramatically reduced infrastructure requirements for the photosharing site, and highly scalable infrastructure.

Figure 2:
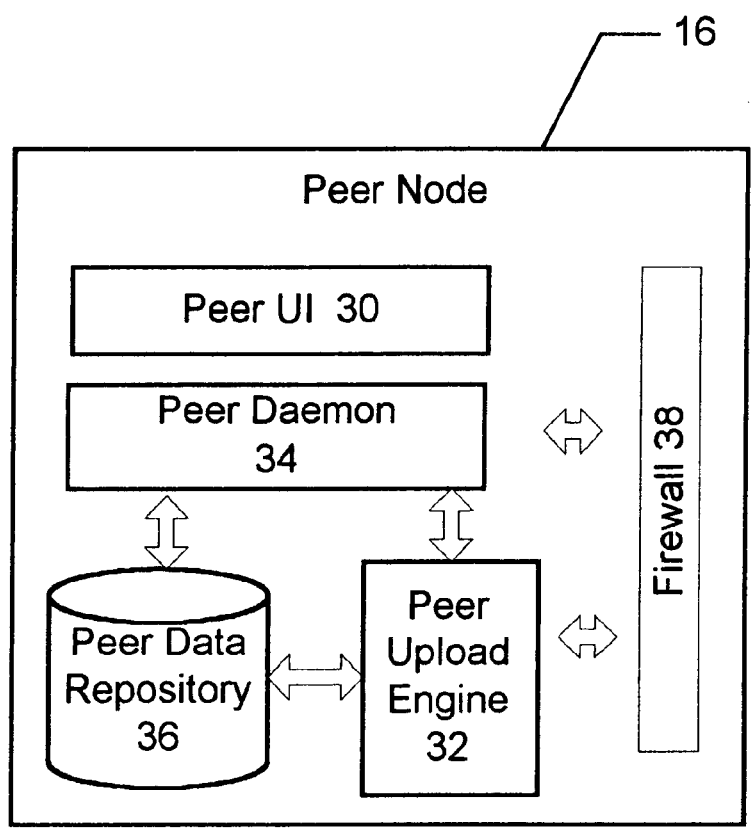
FIG. 2 is a block diagram illustrating the peer node application software.

FIG. 2 is a block diagram illustrating the peer node 16 application software. In a preferred embodiment, a peer node 16 application software includes a peer user interface (UI) 30, a peer upload automation engine 32, a peer daemon 34, and a peer data repository 36. The peer node 16 may also include an optional firewall 38 or access the Internet through a firewall located in another device.

The peer UI 30 is a graphical user interface application that allows the user 18 to view and edit data. The data in most cases is images 20 and associated metadata, which may reside on both the peer node 16 or on remote peer nodes 16. Although the peer UI 30 may be implemented in a number of different ways, in a preferred embodiment the peer UI 30 is implemented as a web browser but alternately it may be an application specifically designed for the system 10.

According to a first aspect of the present invention, the peer daemon 34 automatically assigns metadata 22 to the images 20 prior to the metadata upload process. The peer daemon 34 makes intelligent guesses at how to fill-in the metadata values 22 using defaults specified by the metadata schemas. In addition, the peer daemon is trained over time based on the user's past behavior. The peer daemon 34 then makes use of the peer upload automation engine 32 to send the metadata 22 associated with the images to the peer server 14. The metadata facilities of the peer daemon 34 and peer upload engine 32 allow a user 18 to categorize and upload the metadata 22 for a very large number of images 20 to the peer server 14 with ease. The peer daemon 34 also allows the user 18, to make simple edits to the pictures before the images 20 are stored and the metadata 22 is uploaded (rotation for example).

The peer daemon 34 includes a background process that scans the peer node 16 computer for images 20 that are to be shared, and catalogs metadata about images 20. The peer daemon 34 uses the peer data repository 36 to store images 20 and local copies of the metadata 22. In a preferred embodiment the peer daemon 34 acts as a web server to present the peer UI 30 to the user through a web browser. The peer daemon 34 communicates with the peer server 12 as needed to retrieve presentation components as needed, thus distributing the presentation logic of the system. In a similar manner, the peer daemon 34 may also offload other work from the peer server 14 that is typically the sole responsibility of a central server or site in a traditional photosharing server. Examples of such work activities, include caching and processing of security information, receiving and routing events, acting as a peer proxy 68 for other peer nodes (see description of FIG. 3), and caching user and group account information.

Figure 3:
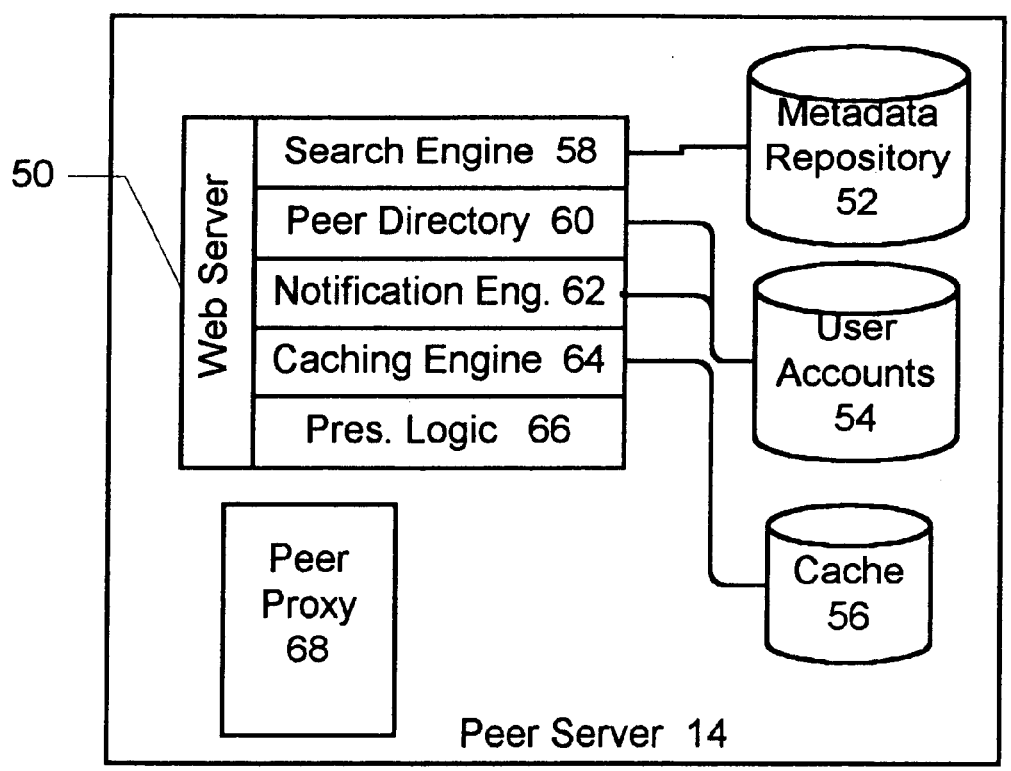
FIG. 3 is a block diagram illustrating the contents of the central site peer server.

FIG. 3 is a block diagram illustrating the contents of the central site peer server 14. In a preferred embodiment, the peer server 14 includes a web server application 50, a metadata repository 52, a user and group account database 54, a cache 56, and a peer proxy 68.

The web server application 50 serves pages formatted to suit the capabilities of the client device so that a standard web browser can be used to view the data returned by the web server. The metadata repository 52 is a database that stores metadata definitions and the metadata 22 uploaded from peer nodes 16 associated with specific images and groups of images 22 associated with images 20 stored on the peer nodes 16. In a preferred embodiment, the metadata definitions are specified using the W3C Resource Definition Framework (RDF) standard. In this preferred embodiment a core metadata schema/vocabulary is defined, which is associated with all images. Groups and users may specify their own metadata 22 vocabularies and may share these vocabularies with other users and groups. Users and group administrators may specify one or more vocabularies, which must be supported for images associated with the user and group accounts, respectively. The peer server 14 and peer nodes 16 enforce these metadata requirements.

The user account database 54 stores user account and corresponding contact information and preferences of each registered user 18. Groups of users may also share common policies, which may include permission settings, UI options, required and optional metadata vocabularies, subscriptions lists, event/notification policies, and caching policies.

The cache 56 is used to store the metadata 22 associated with frequently accessed images 20 to provide for quicker searches. The metadata 22 may be automatically replaced in the cache 56 with the metadata 22 from other images 20 based on the peer server's configured caching policies. The peer proxy 68 allows the peer nodes 16 behind firewalls 38 to connect with peer server 14. Once this connection is established other peer nodes 16 may contact the associated peer node 16 behind a firewall 38 by connecting to the peer proxy which will route requests to the peer node behind the firewall and will route responses to the associated node making the request.

The peer server 14 further includes a search engine 58, a peer directory 60, an event/notification engine 62, a caching engine 64, and presentation logic and resources 66. The search engine 58 takes requests received by various peer nodes 16 and searches through the metadata 22 stored in the metadata repository 52. The search engine 58 also has the capability of offloading searches by passing the search criteria to one or more of the peer nodes 16 to search the metadata 22 stored on the peer node(s)16. In a preferred embodiment, the peer site offloads searches to peer nodes 16 with large amounts of metadata 22. An example of such a peer node 16, is a peer node 16 which is also a traditional centralized photosharing site.

The peer directory 60 maintains a list of active peer nodes 16 and associates the peer nodes 16 with registered users 18 from the user account database 54. The notification engine 62 is responsible for notifying peer nodes 16 when predefined events occur. Examples of predefined events include other peer nodes 16 becoming active, particular images 20 being posted on the peer server 14, or a request being filled. The caching engine 64 interfaces with the cache 56 and is responsible for determining what data to cache, where to cache it, and how long to hold the data.

The presentation logic 66 composes the user interface for user interaction with the peer site. The presentation 66 logic also provides templates and presentation resources (e.g., icons, graphics) used by the peer nodes in composing user interface elements. The presentation logic 66 adapts the presentation based on the capabilities of the requesting device and user 18 preferences.

The peer server 14 may also provide the peer nodes 16 access to external service providers (not shown), which may include print fulfillment providers, or services that burn image albums 26 on CDs or prints real album pages, for instance.

Figure 4:
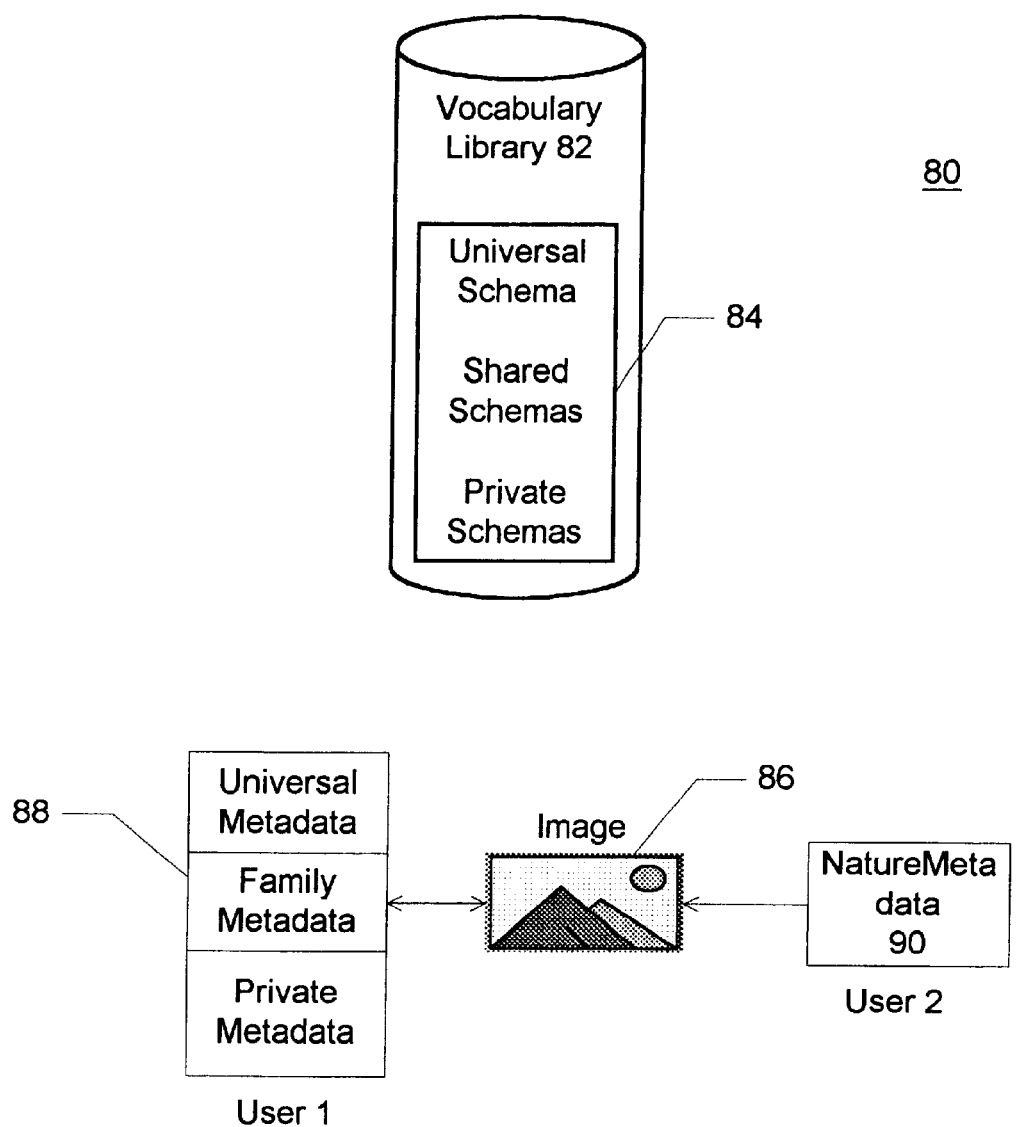
FIG. 4 is a diagram illustrating relationship between metadata schemas that are stored in the metadata repository and the actual metadata and images.

FIG. 4 is a diagram illustrating metadata definitions 80, which are stored in the metadata repository 52. According to the present invention, the system 10 provides a vocabulary library 82 for storage and management of metadata schemas 84 or vocabularies. In a preferred embodiment, the vocabulary library 82 includes a universal schema, shared schemas, and private schemas, which may be defined using RDF and XML. All images 20 in the system 10 are required to have associated with them metadata 22 specified by the universal schema. Users 18 and groups may define their own schemas, which may include the universal schema and may borrow from other vocabularies as RDF and XML allow.

As an example, assume that an image 86 of a family with mountains in the background has been added to the system 10 by a user 18*a*. User 18*a* has defined a private schema 88 that includes the universal schema, borrows from a shared schema defined for family metadata, and adds additional metadata for the user 18*a*'s private use. User 18*b* has discovered image 86, perhaps through a search using fields in the universal schema. Seeing the mountains in the picture and being an avid fan of nature photography user 18*b* creates nature metadata 90 to associate with image 86 using a shared schema defined for nature photographs. User 18*b* has uploaded this metadata 90 for the image to the peer server 14. Other users constructing searches built using one or more of the vocabularies (universal, family, user 18*a*'s private extensions, and nature) will be able to find image 86 if the search criteria match. The schema definition 84 is not limited by the system 10. Further, there is no theoretical limit to the number of separate instances of metadata 22 which could be provided and associated with images 20. Note that it is user 18*a*'s option to share the private schema extensions and the private metadata. User 18*a* may send the private schema specification to the peer server 14 allowing others to construct searches using the private vocabulary. The peer server 14 will require user 18*a*'s peer node to perform the actual search if the actual metadata has not been stored on the peer server 14.

In operation, the user 18 first installs peer software on his or her computer to create a peer node 16 and signs-up for the service. The user 18 may share images 20 that are local on the user's peer node 16 with the photosharing site 12 by uploading the image metadata 22, thus synchronizing the peer node 16 and the peer server 14. To view the data, the user 18 may select predefined albums 26 to view for which he has the necessary permissions or user 18 may submit a search, which results in the creation of dynamic image albums 26 that display the images 20 matching the search criteria. These process steps will now be explained in further detail with reference to FIGS. 5–8.

Figure 5:
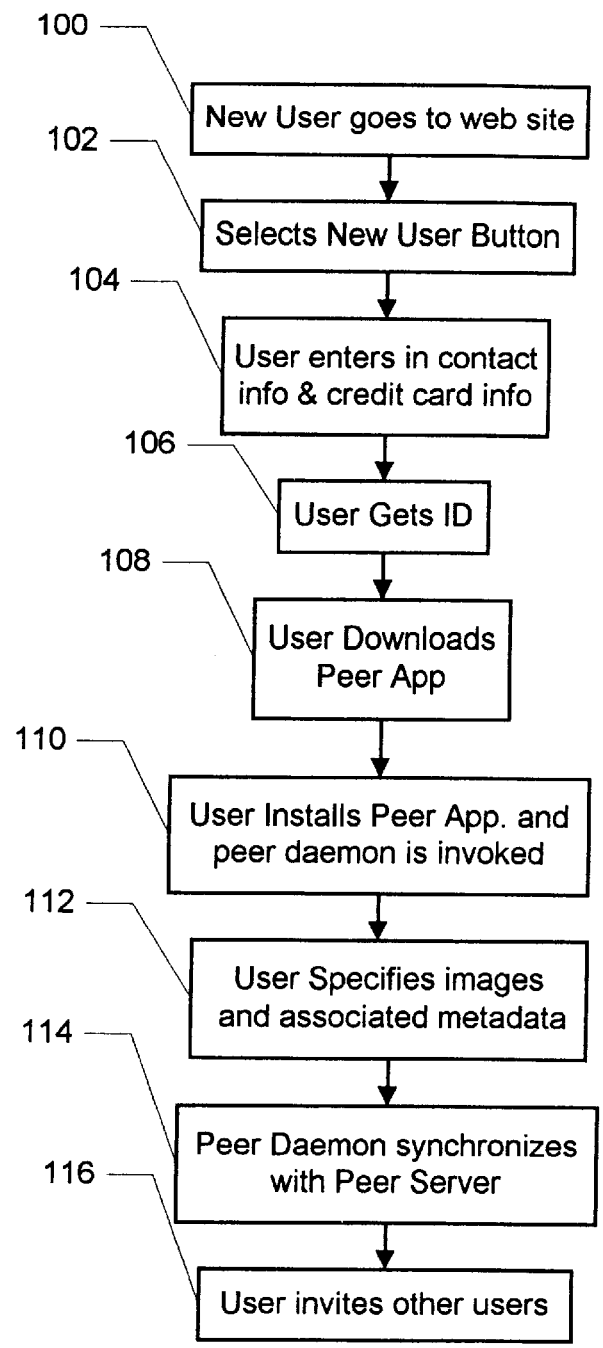
FIG. 5 is a flow chart illustrating a registration and installation process for a user to sign up with the network-based photosharing service.

FIG. 5 is a flow chart illustrating an installation and registration process. The process begins with an Internet user 18 visiting the peer server website is in step 100. The user 18 clicks on a new user button, and is directed to a page for signing up for the peer-to-peer service in step 102. The user 18 enters the required signup information on a sign-up page in step 104. In response, the user 18 obtains a unique peer ID that will be used to identify the user peer node 16 in step 106.

After becoming a registered user 18, the user 18 downloads the peer node application software 16 in step 108. After downloading the peer node software 16, the user 18 installs the peer node software 16 and invokes the peer daemon 34 in step 110. The user 18 is then given the opportunity to specify images 20 and associated metadata 22 that is to be shared using the system 10 in step 112. The peer daemon 34 automates as much of the process of providing metadata 22 as is possible by providing default values for the required data in the required schemas for the user 18. For a first-time user in a preferred embodiment, the only required data is the data specified in the universal schema. The user is given the opportunity to override any of the automatically supplied values.

The peer daemon 34 then synchronizes with the peer server 14 and uploads the metadata 22 in step 114. After the image metadata 22 has been uploaded, the user 18 may invite others registered users 18 to visit the site in step 116. The user 18 may invite non-registered users by providing their email addresses. The non-registered users will be sent emails inviting them to register with the peer server 14 after which they may view the user's 18 images.

Figure 6A:
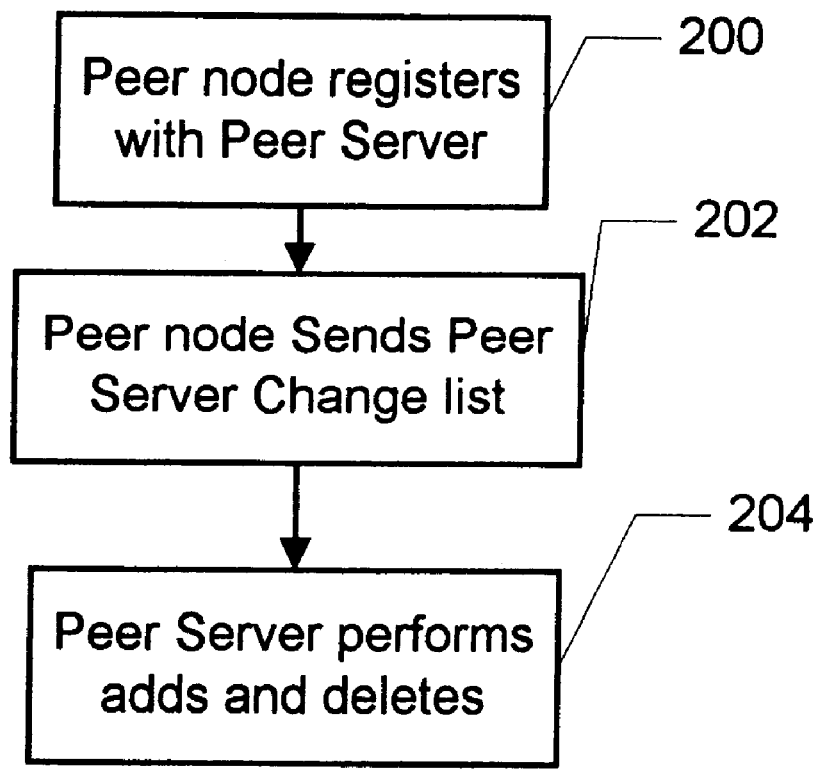
FIG. 6A is a flow chart illustrating in further detail the synchronization process between the peer demon and the peer server (step 114 of FIG. 5).

FIG. 6A is a flow chart illustrating in further detail the synchronization process between the peer daemon 34 and the peer server 14 as described in step 114 of FIG. 5. This process occurs when the peer node 16 is initiated and when initiated by user 18 additions, deletions, and changes while online. FIG. 6 describes this process in terms of peer node initiation. After the peer node 16 has been initiated, the peer daemon 34 registers with the peer server 14 in step 200. After registration, the peer upload engine 32 sends the peer server 14 a change list in step 202 specifying the metadata for images 20 the user 18 wishes to share on the photosharing site 12 as well as those that the user 18 wishes to delete or has modified. The peer server 14 then updates the metadata repository 52 to reflect which images 20 have been added, modified, and which have been deleted in step 204.

Figure 6B:
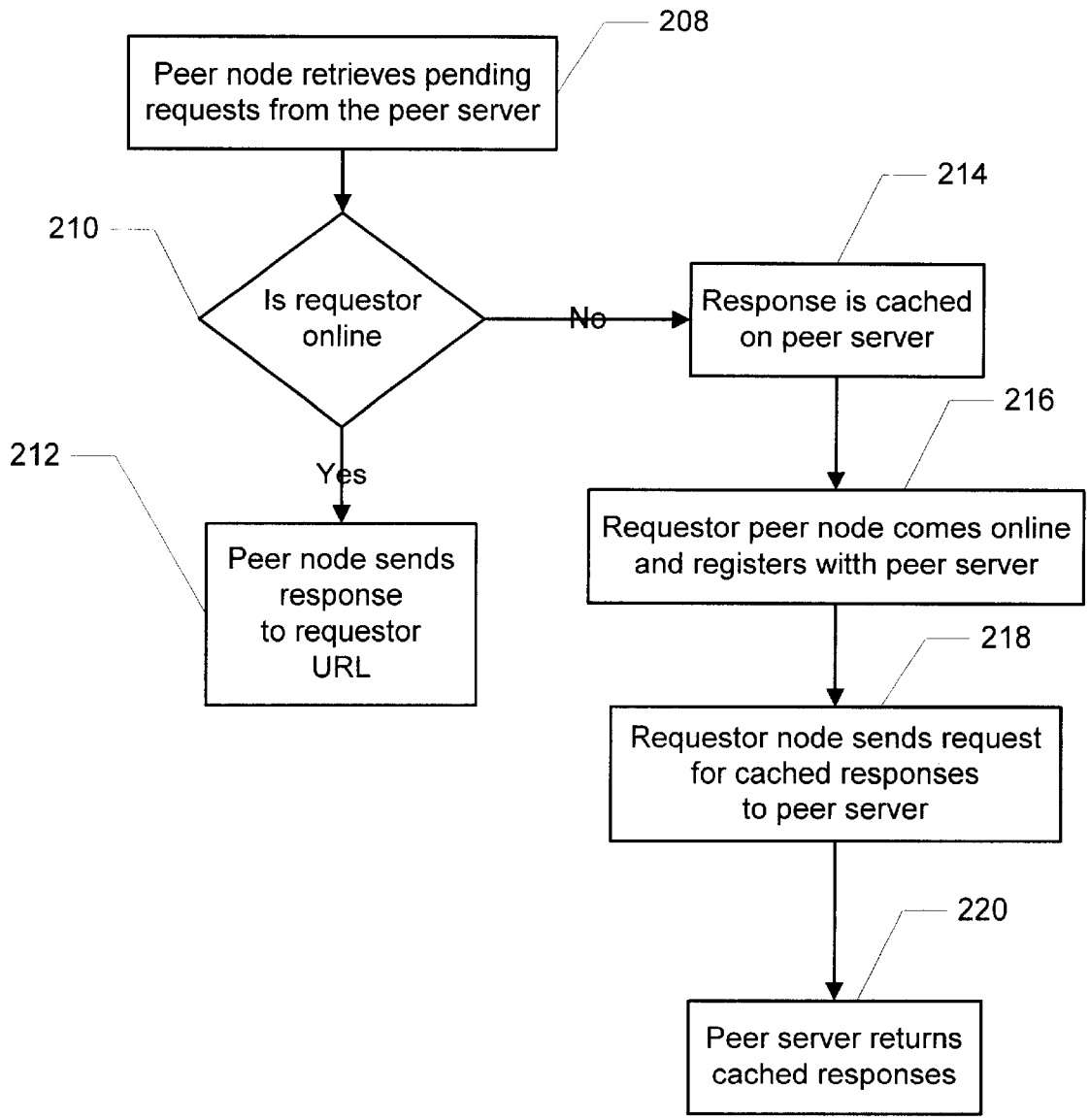
FIG. 6B is a flow chart illustrating the handling of pending requests when a peer node comes back online and has registered with the peer server.

The system 10 allows requests to be made for images 20 on peer nodes 16 that are offline at the time the request is made. FIG. 6B is a flow chart illustrating the handling of pending requests when a peer node comes back online and has registered with the peer server. When the peer node 16 comes online, the peer node 16 sends a request to the peer server 14 to get any pending requests for images that are stored on the peer node 16 in step 208. Each request for an image includes a URL indicating where to send the response. Once the pending requests are received by the peer node 16, the peer node 16 processes each pending request. The response must be handled differently depending on whether the requesting peer node (requester) is currently online or not. In a preferred embodiment this decision is handled at the peer server in step 210.

If the requestor is online in step 210, the peer node 16 sends the response to the requestor as indicated by the URL in the request in step 212. If the requester is not online, then since the peer server 14 tracks the peer nodes 16 that are online, the peer server 14 substitutes the requestor's URL in the request with one of its own prior to sending the pending request to the peer node 16 during step 208. When the peer node 16 subsequently processes the request, the response is sent from the peer node 16 to the peer server 14, as indicated by the URL in the request, where it is cached in step 214. When the requestor comes back online in step 216, the requester then requests the cached response from the peer server 14 in step 218. The peer server 14 then routes the cached response to the requester in step 220.

Note that the processes illustrated in FIG. 6A and FIG. 6B may be executed on separate threads by the peer node 16, so that the user 18 of peer node 16 may interact with the peer node 16 immediately upon peer node initiation without having to wait for synchronization to complete.

FIGS. 7A–D are a flow charts illustrating the process of a user 18 uploading image metadata 22 to the peer server 14 using the peer node software. The user 18 first must choose whether to specify metadata 22 for an image group in step 302, to specify metadata 22 for a batch of images not in a group in step 304, or to specify metadata 22 for images 20 individually in steps 302 and 304. Note these choices are not mutually exclusive. That is, an image 20 may be part of any image group and thus have group metadata 22 associated with it. The same image may also have metadata 22 associated with it alone apart from other images 20 in the group.

Figure 7A:
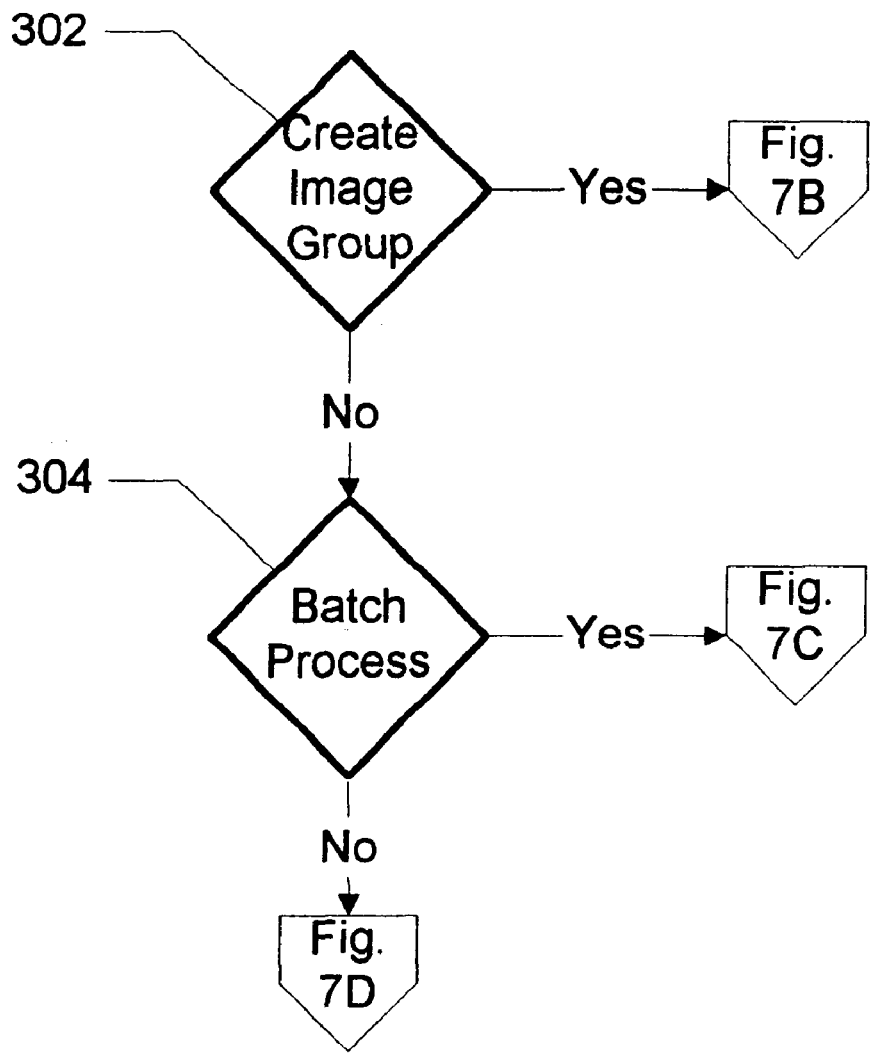
FIGS. 7A–D are flow charts illustrating the process of a user uploading image metadata to the peer server using the peer node software.
Figure 7B:
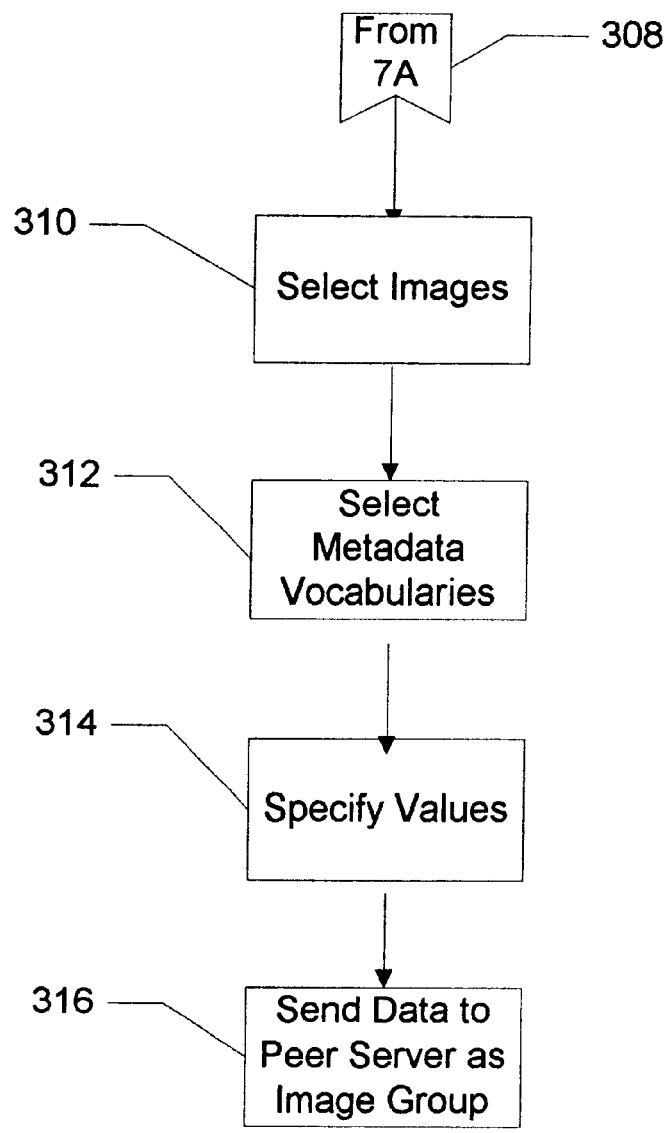

FIG. 7B illustrates the process of providing metadata for an image group. The user 18 first selects images 20 that are to be associated with the group in step 310. The user 18 then selects which metadata vocabularies to use in step 312. The vocabularies are retrieved from the peer server's 14 vocabulary respository 82 and/or from private vocabularies stored on the peer node 16 only. The user 18 may use the vocabularies as is or combine elements of them to create a new vocabulary. The user 18 may accept the default values provided by the system or override them in step 314. The peer node 16 then sends the data to the peer server 14 as metadata 22 associated with a new image group in step 316.

Figure 7C:
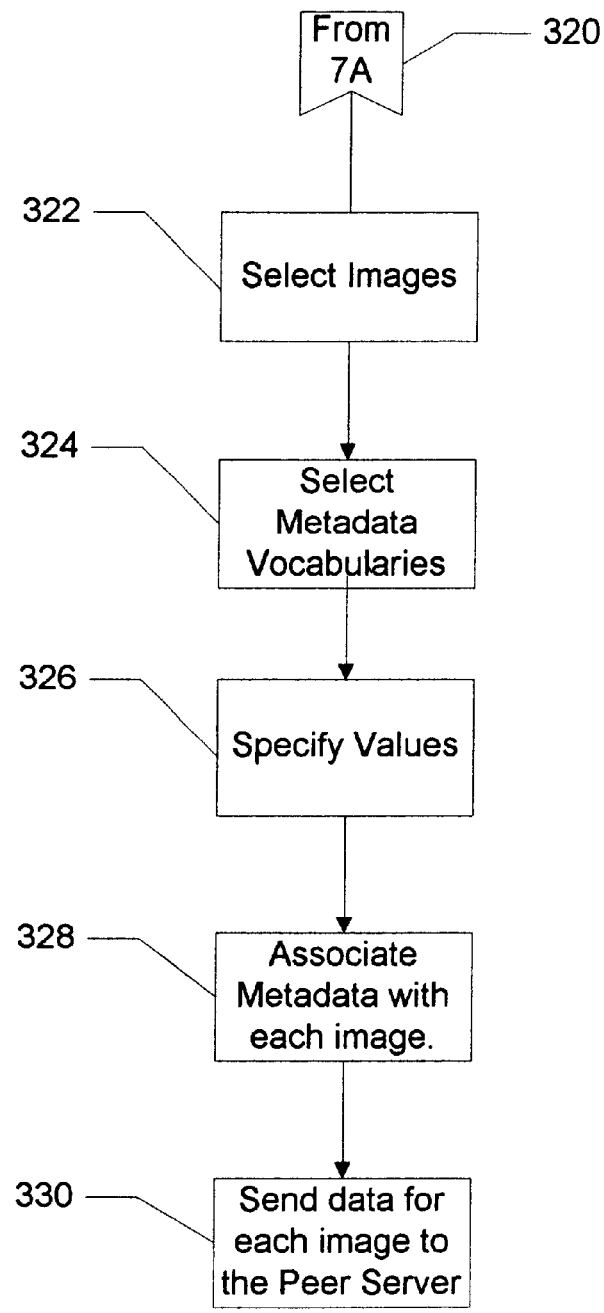

FIG. 7C illustrates the process of providing metadata for images in batch mode. This differs from group metadata in that once the metadata 22 is provided, it is associated with each image 20 separately. The images 20 are not part of an image group with respect to this metadata. It is simply a convenient way to enter metadata for a set of images that share the same vocabularies and many of the same values. The user 18 may follow-up this process by modifying selected data items for each image 20 where the data should vary among images. The user 18 first selects images 20 that are to be associated with the metadata 22 in step 322. The user 18 then selects which metadata vocabularies to use in step 324. The vocabularies are retrieved from the peer server's 14 vocabulary library 82 and/or from private vocabularies stored on the peer node 16 only. The user 18 may use the vocabularies as is or combine elements of them to create a new vocabulary. The user 18 may accept the default values provided by the system or override them in step 326. The peer node 16 then creates separate metadata and associates it with each separate image 20 in step 328. Finally, the peer node 16 sends the metadata 22 for each image 20 to the peer server 14 in step 330.

Figure 7D:
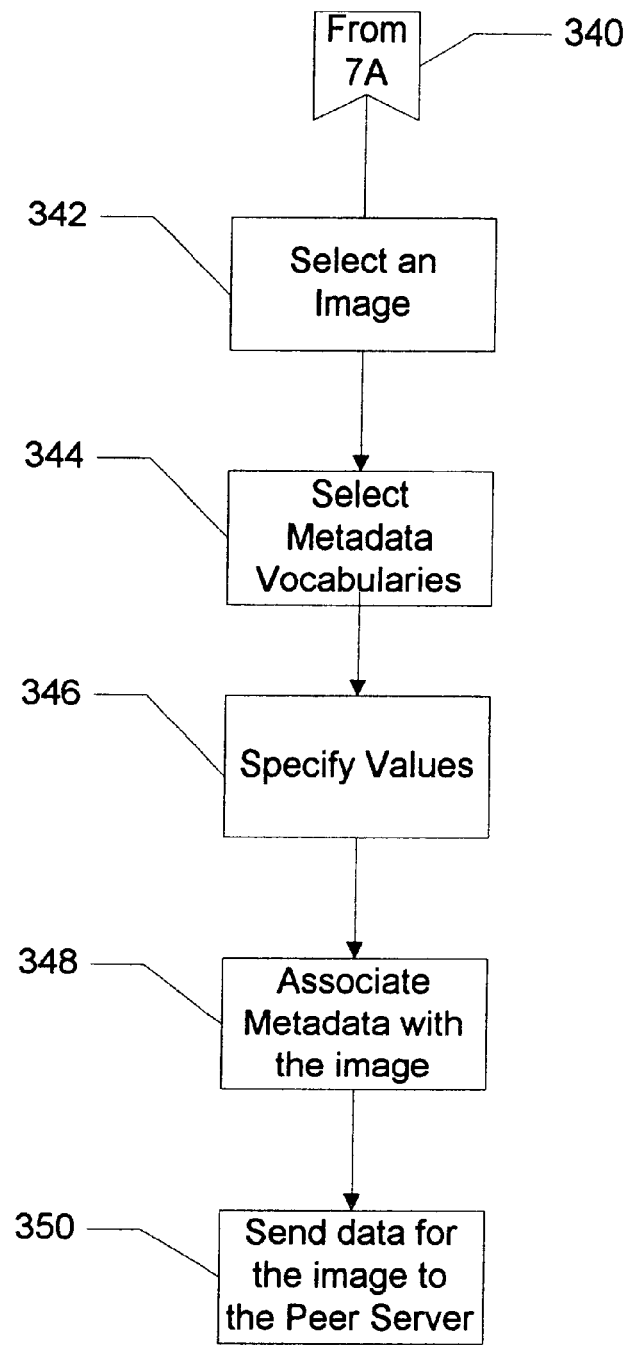

FIG. 7D illustrates the process of providing metadata for an individual image. This process is a special case of batch mode processing where the number of images to process is one. The user first selects the image 20 that is to be associated with metadata 22 in step 342. The user 18 then selects which metadata vocabularies to use in step 344. The vocabularies are retrieved from the peer server's 14 vocabulary library 82 and/or from private vocabularies stored on the peer node 16 only. The user 18 may use the vocabularies as is or combine elements of them to create a new vocabulary. The user 18 may accept the default values provided by the system 10 or override them in step 346. The peer node 16 then creates metadata 22 and associates it with the selected image 20 in step 348. Finally, the peer node 16 sends the metadata 22 for the image 20 to the peer server 14 in step 350.

Figure 8A:
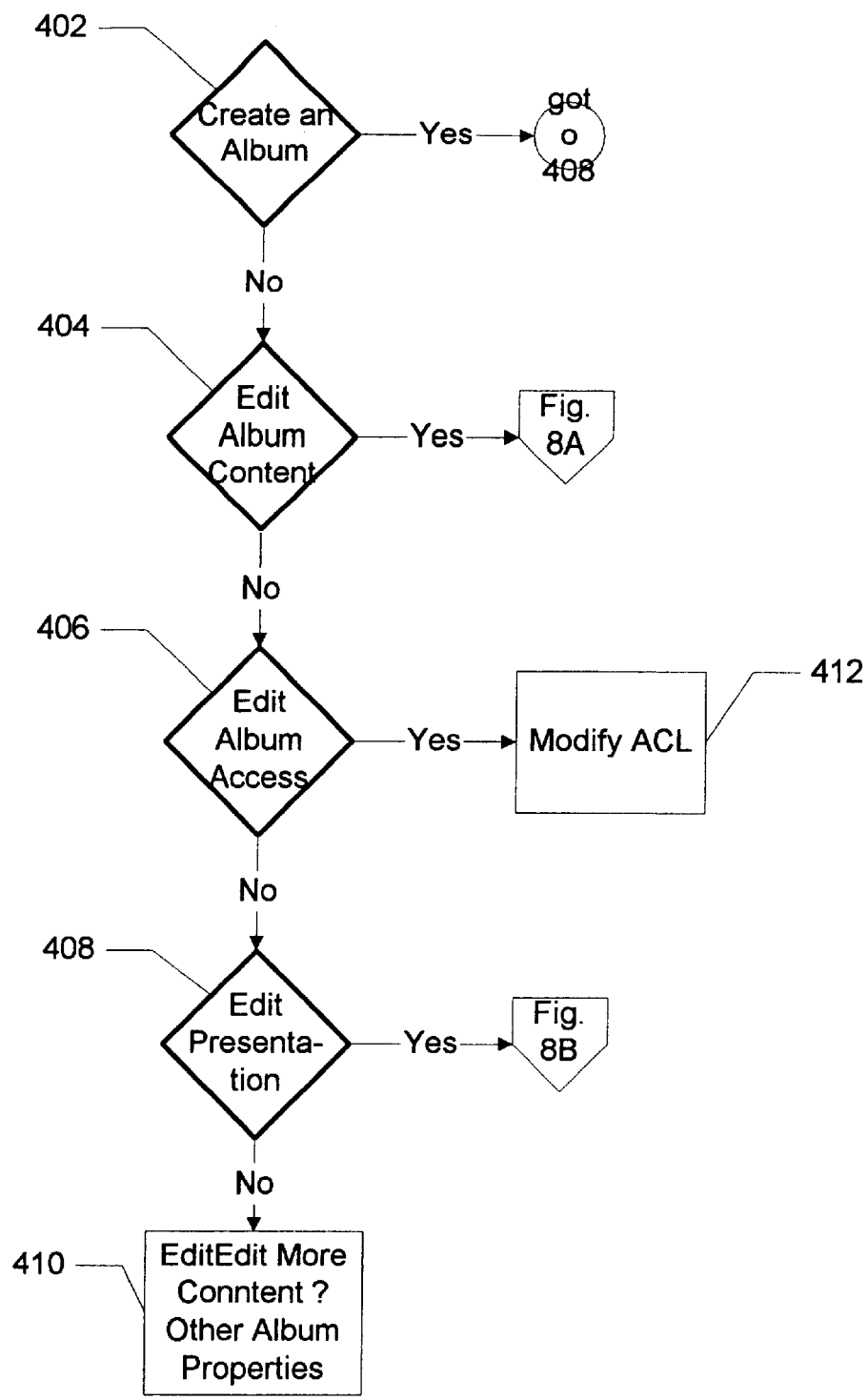
FIGS. 8A–C are flow charts illustrating the process of creating and managing an image album on a peer node.
Figure 8B:
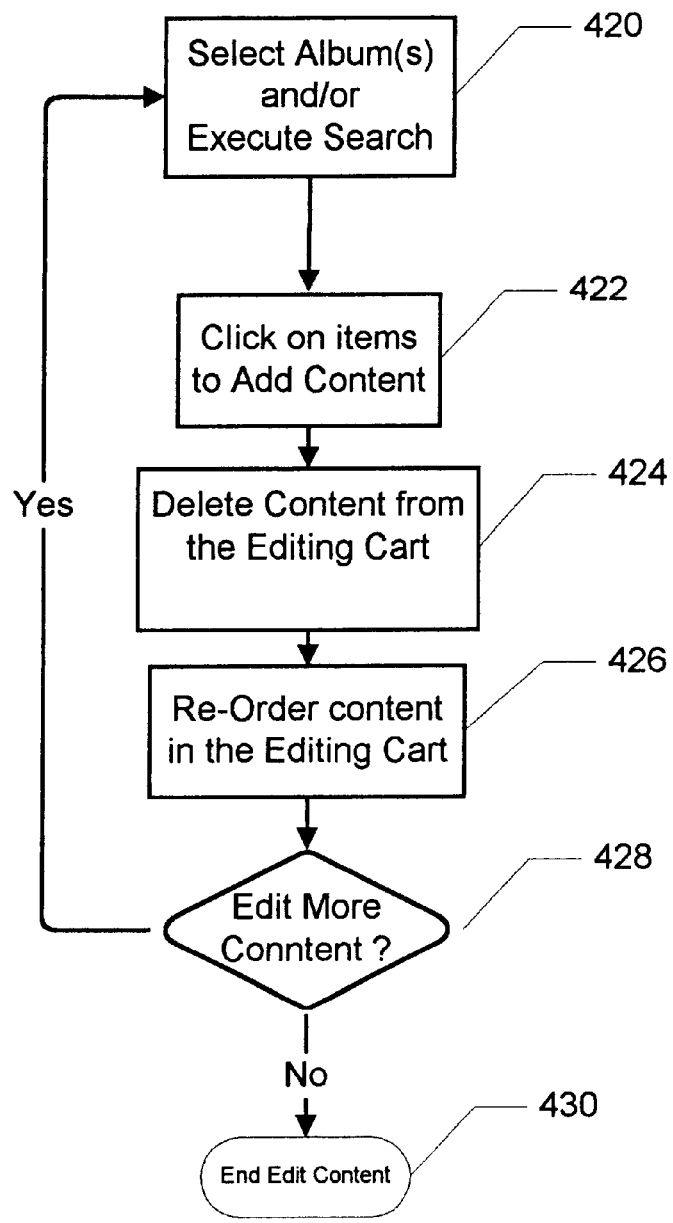
Figure 8C:
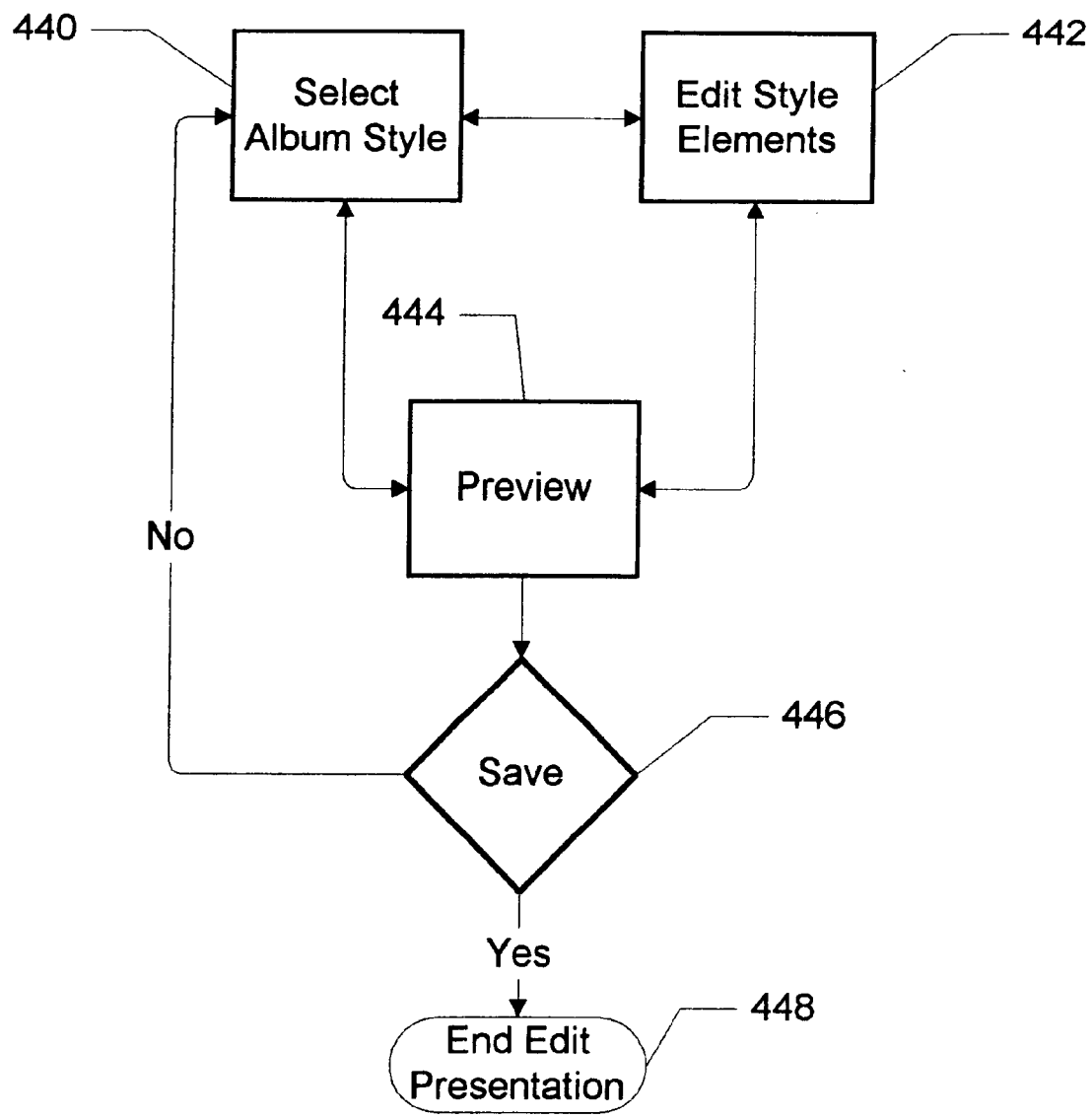

FIGS. 8A–C are flow charts illustrating the process of creating a dynamic image album on a peer node 16. FIG. 8A illustrates the basic choices available to a user 18 for managing albums. A user 18 may choose to create an album 26 in step 402. If the user 18 chooses to create an album 26, the user 18 is prompted to enter certain required information such as the album's 26 name. Once an album 26 exists, the user 18 may edit the contents of the album in step 404, edit access rights to the album 26 in step 406, edit the presentation attributes of the album 26 in step 408, or edit other album attributes (not shown). In a preferred embodiment, access rights management in step 412 is preformed by managing access control lists (ACLs), but may take other forms such as the model supported by the Java Authentication and Activiation Services framework.

FIG. 8B illustrates the process of managing the content of an album 26. The user 18 chooses images for the album 26 by selecting one or more albums previously defined in step 420. They may be albums 26 owned by the user 18 or shared with the user. As an alternative or in addition to choosing images from existing albums 26, the user 18 in step 420 may construct a search. The user 18 then selects images 20 from the selected albums and/or searches to be contained in the album 26, and the selected images 20 are placed in the editing card for the album 26 in step 422. The user 18 may delete images 20 from the editing cart of the album 26 in step 424, and may specify the order of the images 20 in the display by modifying the order of the images 20 in the editing cart of the album 26 in step 426. The user 18 may choose to repeat this process in step 428, until finished in step 430.

FIG. 8C illustrates the process of managing the presentation attributes of the album. The user 18 selects from a list of predefined presentation styles in step 440. The user 18 may then either preview the album 26 in the selected style in step 444 or modify style elements of the selected style in step 442. The user may repeatedly navigate through steps 440, 442, and 444 as needed until the user 18 is satisfied with the presentation of album 26. The user 18 then saves the presentation attributes for the album 26 in step 446 (and may save them as a new named style for later use, or to share with others), and finishes management of the presentation of album 26 in step 448.

A peer-to-peer photosharing service has been disclosed in which peer nodes maintain storage of actual image data, while uploading metadata corresponding to the images to a peer server for searching by other peer nodes. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for providing a network-based photosharing service, the photosharing service including a central photosharing site having a server, and a plurality of peer nodes each containing digital images; the method comprising the steps of:

(a) associating with each image that is to be shared on the photosharing site from the peer nodes with metadata describing the image;

(b) sharing the images on the photosharing site by uploading the metadata associated with each image from the peer nodes to the server, while maintaining storage of the images on the respective peer nodes;

(c) in response to the server receiving search criteria based on the metadata submitted from a first one of the peer nodes, returning a list of image locators for images matching the search criteria to the first peer node; and (d) dynamically generating on the first peer node an image album that contains at least a portion of the matching images by using at least a portion of the image locators to request that the matching images be retrieved from the peer nodes storing the images, (e) wherein step (d) further includes the step of: if one or more images are stored in a second peer node, but the second peer node is offline or does not have a network address which is reachable from the first peer node, modifying the image locator to route the request for the image back to the server;

(f) indicating in the image locators whether the corresponding peer node are currently online so that the first peer node can use the image locators to retrieve the images directly from the corresponding peer node without first sending a request to the server.

2. The method of claim 1 wherein step (d) further includes the step of: if one or more of the images to be incorporated into the album are stored on the first peer node, then retrieving the images from the first peer node, and if one or more of the images to be incorporated into the album stored on other peer nodes, using the image locators to retrieve the images directly from the other peer nodes.

3. The method of claim 1 wherein step (a) further includes providing a thumbnail image in the metadata associated with each of the images.

4. The method of claim 1 wherein step (d) further includes the step of: if the album is to include thumbnail images, then returning the thumbnail images from the server directly to the first peer node.

5. The method of claim 1 further including the steps of:

(f) allowing requests to be made for images on a second peer node that is offline at the time the request is made, resulting in pending requests, and (f) processing the pending request when the second peer node comes back online and has registered with the server.

6. The method of claim 5 wherein step (f) further includes the step of: when the second peer node comes online, sending from the server to the second peer node any pending requests for images, wherein each pending request for an image sent to the peer node includes a URE indicating where to send the response.

7. The method of claim 6 wherein the peer node that made the request is referred to as the requestor, step (f) further including the step of:

(i) If requestor is online, sending a response from the second peer node to the requestor as indicated by the URL in the request;

(ii) If the requestor is not online, substituting the requestor's URL in the request with a URL from the server prior to sending the pending request to the second peer node so that the second peer node sends the response back to the server, and when the requestor comes back online, sending the response from the server to the requestor.

8. The method of claim 1 wherein step (a) further includes the step of: providing a vocabulary library for storage and management of metadata schemas.

9. The method of claim 8 wherein step (a) further includes the step of: including in the vocabulary library a universal schema, shared schemas, and private schemas.

10. The method of claim 9 wherein step (a) further includes the step of: requiring all images in the network to include metadata that is specified by the universal schema.

11. The method of claim 10 wherein step (a) further includes the step of: allowing both users and groups of users to define their own schemas, which include the universal schema.

12. The method of claim 1 wherein step (d) further includes the step of: allowing the user to select images returned from the search and to add them and an editing card that maintains a list of images the user is considering for inclusion in the album.

13. The method of claim 8 wherein step (d) further includes the step of: allowing the user to select a presentation style for the album.

14. The method of claim 9 wherein step (d) further includes the step of: saving the album.

15. The method of claim 10 wherein step (d) further includes the step of: saving the search criteria.

16. A peer-to-peer photosharing system, comprising:

a plurality of peer nodes, wherein each node stores respective images, and each image has an associated a set of metadata describing the image;

a central site in communication with the peer nodes over a network, such that when images from each of the peer nodes are to be shared on the central site, the peer nodes upload the metadata for the respective images to the central site, while maintaining storage of the image data on the respective peer nodes, the central site further functioning to allow a user of one of the peer nodes to submit a search request based on the metadata, and in response, returns a list of image locators for images matching the search criteria; and application software on each of the peer nodes for dynamically displaying image albums from selected ones of the images on the list by using the image locators to retrieve the images from other peer nodes; wherein a pending request results from a request being made for images on a second peer node that is offline at the time the request is made, and wherein the pending request is processed when the second peer node comes back online and has registered with the peer server.

17. The photosharing system of claim 16 wherein the central site stores a vocabulary library for storage and management of metadata schemas.

18. The photosharing system of claim 17 wherein the vocabulary library includes a universal schema, shared schemas, and private schemas.

19. The photosharing system of claim 18 wherein all images in the network are required to include metadata that is specified by the universal schema.

20. The photo sharing system of claim 19 wherein the central site includes a cache for storing the metadata associated with frequently accessed images to provide for quicker searches.

21. The photo sharing system of claim 18 wherein when the second peer node comes online, the server sends to the second peer node any pending requests for images, wherein each pending request for an image sent to the peer node includes a URL indicating where to send the response.

22. The photosharing system of claim 21 wherein the peer node that made the request is referred to as the requestor, and wherein if requestor is online, a response is sent from the second peer node to the requestor as indicated by the URL in the request, and if the requestor is not online, the requestor's URL in the request is substituted with a URL from the server prior to sending the pending request to the second peer node so that the second peer node sends the response back to the server, and when the requestor comes back online, the response is sent from the server to the requestor.

23. The photosharing system of claim 16 wherein each of the peer nodes includes a user interface for applying metadata to images and for performing searches of images.

24. The photosharing system of claim 23 wherein the user interface allows the user to select images returned from the search and add them and an editing card that maintains a list of images the user is considering for inclusion in the album.

25. The photo system of claim 24 wherein the user interface allows the user to select a presentation style for the album.

26. The photosharing system of claim 25 wherein each other peer nodes includes a background process that scans the peer node for images to be shared, and catalogs metadata about images.

27. The photosharing system of claim 26 wherein each of the peer nodes includes a data repository for storing image metadata.

28. A peer-to-peer photosharing system, comprising:
  (a) a photosharing site including a server node accessible over a network; and
  (b) a plurality of peer nodes, each peer node including,
    (i) one or more digital images, each image having an associated set of metadata categorizing the image,
    (ii) communication software for enabling the peer node to act as a server to all other nodes;
    (iii) upload software for allowing a user to share images on the central site by submitting the metadata associated with the images to the central site, while maintaining storage of the image data on the peer node, and
    (iv) user interface software for allowing a user to search for images stored throughout the system by entering search terms based on the metadata, the user interface software responsive to the central site returning a list of image locators for images matching the search criteria for dynamically generating an image album by using the image locators to request that the images be downloaded from the peer nodes storing the images, wherein once the images are received, the images are displayed in the album to the user;
  if one or more images are stored in a second peer node, but the second peer node is offline or does not have a network address which is reachable from the first peer node, modifying the image locator to route the request for the image back to the server;
  indicating in the image locators whether the corresponding peer node are currently online so that the first peer node can use the image locators to retrieve the images directly from the corresponding peer node without first sending a request to the server.

29. The system of claim 28 wherein if one or more of the images to be incorporated into the album are stored on a first peer node, then the images are retrieved from the first peer node, and if one or more of the images to be incorporated into the album stored on other peer nodes, the image locators are used to retrieve the images directly from the other peer nodes.

30. The system of claim 29 wherein each of the peer nodes further includes a data repository for storing the metadata associated with the images stored on the respective peer node.

31. The system of claim 30 wherein the metadata may be applied to individual images or to groups of images.

32. The system of claim 31 wherein the image locators indicate whether the corresponding peer nodes are currently online so that the first peer node can use the image locators to retrieve the images directly from the corresponding peer nodes without first sending a request to the peer server.

33. The system of claim 32 wherein the metadata associated with each of the images includes a thumbnail image.

34. The system of claim 33 wherein the photosharing site maintains a metadata repository for storing a vocabulary library of metadata definitions.

35. The system of claim 34 wherein the photosharing site maintains a cache for caching the metadata of frequently accessed images to speed searching.

* * * * *

UNITED STATES PATENT AND TRADEMARK OFFICE
CERTIFICATE OF CORRECTION

PATENT NO. : 6,757,684 B2  
APPLICATION NO. : 09/968393  
DATED : June 29, 2004  
INVENTOR(S) : Hugh Svendsen Page 1 of 1

It is certified that error appears in the above-identified patent and that said Letters Patent is hereby corrected as shown below:

Column 11, line 37, "URE" should read --URL--

Column 12, line 47, "18" should read --16--

Column 12, line 52, "21" should read --16--

Signed and Sealed this

Seventeenth Day of April, 2012

David J. Kappos  
*Director of the United States Patent and Trademark Office*